July 2, 1940.  F. GEITZ, JR  2,206,319
VITAMINIZING COFFEE
Filed Dec. 15, 1938
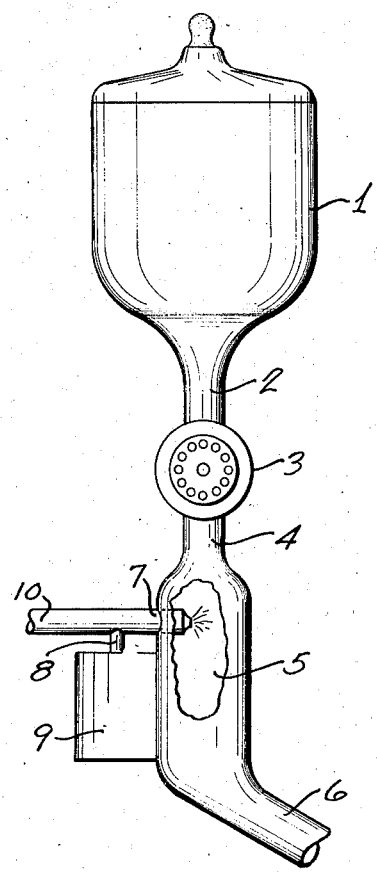
INVENTOR
FRED GEITZ, JR.
BY
ATTORNEY Patented July 2, 1940

2,206,319

UNITED STATES PATENT OFFICE 2,206,319

VITAMINIZING COFFEE

Fred Geitz, Jr., St. Louis, Mo.

Application December 15, 1938, Serial No. 245,898

3 Claims. (Cl. 99—11)

This invention relates generally to beverages, drinks, and the like and, more particularly, to a certain new and useful improvement in coffee and to the method of producing the same.

As is well known by biologists and biochemists, the various vitamins which have been to the present time isolated have certain specific effects upon animal development. With humans, for instance, as is now widely appreciated, the absence of certain vitamins from the diet results in specific diseases, such as scurvy and pellagra. The absence of other vitamins may cause endocrine maladjustments, which affect growth, sexual development, and even psychological temperament and disposition.

A well balanced diet should ordinarily include proper quantities of foods containing the various vitamins in sufficient quantity for the normal human need. Selective taste, however, has to a large extent produced an abnormal vitamin unbalance, which ultimately effects vitamin shortage in the human system and ensuing vitamin deficiency diseases.

Such problems are particularly important in the case of certain kinds of foods or drinks, which are more or less regularly consumed, such as coffee and other potable liquids. In this country and elsewhere, the drinking of coffee at meal times has become a widely established custom. Unfortunately, however, coffee contains a substantial quantity of caffeine, which, it has been found, produces in the human system an abnormal craving for carbohydrate food substances, which incidentally are substantially deficient in vitamins. It has hence become apparent that the heavy coffee drinker is most vulnerable to vitamin deficiency diseases.

Oddly enough, the vitamin deficiency problem created by coffee and other potable drinks is further complicated by the fact that, although the original natural product contains a substantial quantity of vitamins and particularly vitamins B and C, nevertheless the roasting process through which the natural product passes for edibility destroys substantially all the vitamins originally present.

My invention, accordingly, has for its primary objects, and resides in, the provision simply, inexpensively, and economically of coffee rich in vitamin content and particularly rich in vitamins B and C, and which, in addition, produces a highly pleasing potable drink possessing not only all the original qualities of taste, color, and aroma inherent in normal so-called unprocessed coffee, but also and in addition a highly enriched vitamin content.

Essentially my invention has to do with the enriching of the coffee and the drink brewed or produced therefrom with sufficient A, B, and C vitamins for preservation of health of the body. Such enrichment may be effected in any suitable manner. Preferably, however, for such purpose I employ an apparatus of which the accompanying drawing is a front elevational view, partially broken away and in section.

Of such apparatus, 1 is a storage container for receiving the roasted coffee beans. Formed preferably with, and extending downwardly from, the storage container 1, is a connector-pipe 2 communicating at its lower end with the intake side of a conventional grinding mill 3, which, in turn, is provided at its discharge side with a downwardly extending conduit or connector-pipe 4.

At its lower end, the conduit or connector-pipe 4 preferably opens into a diametrically enlarged pipe-section or chamber 5, which, in turn, at its lower end opens into a discharge pipe or spout 6.

Mounted in, and extending through, the side wall of the chamber 5, is an atomizer nozzle 7 having an inductor arm 8 extending downwardly into the solution container 9 and being connected through a pressure line 10 to a suitable source or supply of gas under pressure.

In use, the container 9 is filled with an aqueous solution of vitamins B and C, which may now be obtained in crystalline water and soluble form. It will, of course, be evident that the concentration of this aqueous solution will determine the amount of the vitamin-enrichment in the coffee being processed. By experiment, I have found that approximately 50 grams of vitamin C and 3.34 grams of vitamin B should be dissolved in a sufficient quantity of water for atomized coating deposition upon approximately a ton of coffee. I have found that this concentration will introduce approximately ten units (International Units) of both vitamins B and C into each normally sized cup of coffee ultimately brewed, which amount gives the drinker sufficient of both vitamins to cover diet-deficiencies.

I have also found that best results are obtained by the use of carbon-dioxide, nitrogen, or some other inert gas for the production of the atomizing pressure, since freshly roasted and ground coffee is rather susceptible to oxidation, although fairly satisfactory results have been achieved by the use of compressed air.

With the container 9 properly filled, gas pressure is introduced through the supply line 10 to the atomizer nozzle 7, producing a very finely divided spray or fog-like mist within the chamber 5.

The ground coffee, upon passing through such fog-like mist within the chamber 5, is coated over substantially its entire surface with an enclosing layer of the vitamin-containing solution. The coffee bean, as is well known, is more or less porous, and, by reason of the extreme state of sub-division of the solution particles in the chamber 5, the amount of moisture deposited upon, and to some extent very possibly absorbed, as it may be said, by, each coffee-particle will not be sufficient to materially affect its physical characteristics. Furthermore, during the course of its travel downwardly through the lower portion of the chamber 5 and the outlet pipe 6, the deposited moisture evaporates off, leaving a very thin imperceptible vitamin-film over the exterior of the coffee, which not only enriches the vitamin content of the coffee, but functions to some extent, at least, in preserving the freshness of the coffee.

A graduation on the chamber 5 enables the operator to accurately gauge the rapidity of atomization required to insure a uniform application of the vitamin-solution to the flowing coffee, and from the grinding capacity of the grinder 3, the flow of liquid may be accurately timed or regulated for thorough vitaminization, as I may say.

In this connection, I have also found that coffee and similar substances may be treated with vitamin A, a water insoluble vitamin, by forming an emulsion of vitamin A and atomizing the emulsion substantially in the manner above described.

I may add that I have also found that, instead of utilizing aqueous solutions of vitamins B and C, I may also employ hydro-alcoholic solutions, alcoholic, or oil solutions and suspensions of the vitamins mentioned, all of which may be successfully atomized.

The coffee product so treated, processed, or filmed may be commercialized through grocery-stores and other establishments the same as ordinary, standard, or unprocessed coffee, and may be employed like ordinary coffee in the production of the drink. However, in the brewing of the drink, the vitamin-film is dissolved off and becomes, as it may be said, an ingredient or constituent of the drink, adding and giving to the drink a long desired vitamin-content so important to the health of the drinker.

It should be understood that changes and modifications in the coffee product and its method of treatment may be made and substituted for those herein described without departing from the nature and principle of my invention.

Having thus described my invention, what I claim and desire to secure by Letters Patent is,

1. The method of enriching the vitamin content and of preserving ground coffee, which comprises directing freshly ground coffee in a stream through a closed passage, and directing across and through the flow of the ground coffee a fog-like mist formed by the atomization of a vitamin-containing solution with an inert gas thereby guarding against oxidation of the freshly ground coffee and accomplishing a vitamin film coating subsequently preserving the freshness of the coffee.

2. The method of enriching the vitamin content of coffee and of preserving the freshness of the same, which comprises grinding the coffee beans in a confined passage and substantially immediately passing the ground coffee in a stream through a highly atomized mist formed by the atomization with an inert gas of a solution containing the desired vitamins while confining the ground coffee in the inert gas thereby guarding against oxidation of the freshly ground coffee and accomplishing a vitamin film coating enriching and preserving the freshness of the ground coffee.

3. The method of enriching the vitamin content and preserving the freshness of coffee, which comprises grinding the coffee in a confined passage whereby the ground particles descend by gravity through the passage, and spraying the ground coffee in said passage with a fog-like mist formed by the atomization of a vitamin-containing solution with carbon dioxide gas.

FRED GEITZ, Jr.